US008700830B2

(12) United States Patent
Hasan et al.

(10) Patent No.: US 8,700,830 B2
(45) Date of Patent: Apr. 15, 2014

(54) MEMORY BUFFERING SYSTEM THAT IMPROVES READ/WRITE PERFORMANCE AND PROVIDES LOW LATENCY FOR MOBILE SYSTEMS

(75) Inventors: Qamrul Hasan, Santa Clara, CA (US); Stephan Rosner, Campbell, CA (US); Roger Dwain Isaac, Santa Clara, CA (US)

(73) Assignee: Spansion LLC, Sunnyvale, CA (US)

( * ) Notice: Subject to any disclaimer, the term of this patent is extended or adjusted under 35 U.S.C. 154(b) by 532 days.

(21) Appl. No.: 11/943,544

(22) Filed: Nov. 20, 2007

(65) Prior Publication Data
US 2009/0132736 A1    May 21, 2009

(51) Int. Cl.
*G06F 13/12*        (2006.01)
(52) U.S. Cl.
USPC .......................................................... 710/74
(58) Field of Classification Search
USPC .......................................................... 710/74
See application file for complete search history.

(56) References Cited

U.S. PATENT DOCUMENTS

| | | | |
|---|---|---|---|
| 5,325,513 A | | 6/1994 | Tanaka et al. |
| 5,357,621 A | * | 10/1994 | Cox ............................. 711/172 |
| 6,009,275 A | * | 12/1999 | DeKoning et al. ............ 710/220 |
| 6,249,526 B1 | * | 6/2001 | Loukianov .................... 370/442 |
| 6,529,518 B1 | * | 3/2003 | Webber ......................... 370/403 |
| 6,880,028 B2 | * | 4/2005 | Kurth ............................ 710/240 |
| 7,412,574 B2 | * | 8/2008 | Jeddeloh ....................... 711/158 |
| 2003/0219031 A1 | * | 11/2003 | Gyselings et al. ............. 370/442 |
| 2006/0294295 A1 | | 12/2006 | Fukuzo |
| 2007/0033336 A1 | | 2/2007 | Oh |
| 2007/0100836 A1 | * | 5/2007 | Eichstaedt et al. .............. 707/10 |

FOREIGN PATENT DOCUMENTS

EP          0691616 A1       1/1996

OTHER PUBLICATIONS

International Search Report for Application # PCT/US2008/084046 dated May 18, 2009.

* cited by examiner

*Primary Examiner* — Henry Tsai
*Assistant Examiner* — Juanito Borromeo
(74) *Attorney, Agent, or Firm* — Sterne, Kessler, Goldstein & Fox P.L.L.C.

(57) ABSTRACT

A memory buffering system is disclosed that arbitrates bus ownership through an arbitration scheme for memory elements in chain architecture. A unified host memory controller arbitrates bus ownership for transfer to a unified memory buffer and other buffers within the chain architecture. The system is used within a communication system with a bus in chain architectures and parallel architectures.

19 Claims, 10 Drawing Sheets

600

TDMA Scheme for BUS
ownership

HOST-CLIENT_0 ⸺ 602

| CLK CYCLE 1 | CLK CYCLE 2 | CLK CYCLE 3 | CLK CYCLE 4 | CLK CYCLE 5 |
|---|---|---|---|---|
| DRAM | DRAM | DRAM | NOR | NAND |

HOST_0-CLIENT_1 ⸺ 604

| CLK CYCLE 1 | CLK CYCLE 2 | CLK CYCLE 3 | CLK CYCLE 4 | CLK CYCLE 5 |
|---|---|---|---|---|
| NOR | NAND | NOR | NAND | NOR |

HOST_1-CLIENT_2 ⸺ 606

| CLK CYCLE 1 | CLK CYCLE 2 | CLK CYCLE 3 | CLK CYCLE 4 | CLK CYCLE 5 |
|---|---|---|---|---|
| NAND | NAND | NAND | NAND | NAND |

FIG. 6

Single Read/Write: PRE_CHRG->ACTIVE->READ/
WRITE BL =4->PRE_CHRG

| Clk | 1 | 2 | 3 | 4 | 5 | 6 | 7 | 8 | 9 | 10 | 11 | 12 | 13 |
|---|---|---|---|---|---|---|---|---|---|---|---|---|---|
| Cmd | PRECH | | | ACT | | | RD/WR | | | D | D | PRECH | |
| Delay | TRP-3 | | | TRCD-3 | | | TCL-2 | | | 0/1 | 2/3 | TRP-3 | |
| | | | | | TRAS-3 | | | | | | | | |

FIG. 9a

DRAM Command
Execution time (in clk
cycles)

| Param | DDR | Note |
|---|---|---|
| TREF | 9 | 1 |
| TRC | 9 | 2 |
| TRCD | 3 | 3 |
| TRP | 3 | 4 |
| TRRD | 2 | 5 |
| TRAS | 3 | 6 |
| TWPD | 3 | 7 |
| TCL | 3 | 8 |

FIG. 9b

MEMORY BUFFERING SYSTEM THAT IMPROVES READ/WRITE PERFORMANCE AND PROVIDES LOW LATENCY FOR MOBILE SYSTEMS

FIELD OF THE INVENTION

The present invention relates generally to memory devices and the like, and in particular, to a system and method of providing a unified buffering system for improving read/write performance and latency in mobile phone systems.

BACKGROUND OF THE INVENTION

Current mobile platforms, such as mobile phones contain NOR, NAND and DRAM type of memory. Each of these memories has a different use and different read/write timing cycles. DRAM is fastest of NOR, NAND, and DRAM memories and has the characteristics of symmetrical read/write performance. The bus delay (i.e. the time to transfer data from a host buffer to a memory buffer) is very short for all the memories. The internal memory delay (i.e. the time to transfer data from the memory buffer to a memory array) is very short for DRAM, but relatively large for NAND and NOR type memory. A dram at 166 MHz, for example, could achieve a bandwidth in a range of about 2 GB/sec. However, NOR and NAND type memories could achieve a bandwidth in the range of about 10 MB/sec to about 100 MB/sec.

Buffers for each type of memory are specifically designated to each specific type of memory. In most cases, not all of the memories are accessed at the same time by an application. Therefore, the buffers specifically dedicated to each type of these memories are either empty or completely full at various times depending on load conditions. Having many separate memories increases the complexity and the cost of a system. For example, there may be times when an optical decoder is not being used because no image is being displayed or captures. During those times, the memory dedicated to the optic decoder will be unused even though it may be useful for other subsystems. Because all of the buffers in the system are not available to all of the subsystems that require temporary storage, the resources will be underutilized, and consequently the system will be less efficient than it could be. Sometimes, data in one memory has to be transferred to another memory in order to be processed or shared with the processor attached to a second memory. Hence, the system is less efficient because of the extra transfer operations required to share data. Because the buffers are dedicated to each memory and often reside empty, there is a need to utilize these resources in order to improve read/write performance and reduce latency, in particular for telecommunications.

In response to inexorable demand for faster data throughput and larger storage capacity, memory systems have progressed from asynchronous to synchronous designs. As systems progress to accommodate more memory devices than before each additional memory device connection reduces signaling margins due to increased bus capacitance and number of stubs and therefore, increasingly compromising the peak transfer rate of the system. Designers often make a choice between system capacity and data throughput. Hence, one such trend arising is an ongoing effort to connect memories in chain architecture while allocating adequate bus ownership for efficient transfers.

Systems often have shared resources that are in common. For example, a memory bus shares capacity in common with various memories requiring transfer. While numerous arbitration schemes have been developed to try and provide fair and efficient allocation of system resources for scheduling problems that involve multiple requesters requesting multiple shared resources, it would be desirable also to have an improved arbitration scheme that provides for higher aggregate usage of the shared resources while still providing a minimum level of fairness.

SUMMARY OF THE INVENTION

The following presents a simplified summary in order to provide a basic understanding of some aspects of the invention. This summary is not an extensive overview. It is intended neither to identify key or critical elements of disclosure nor to delineate the scope of the disclosure. Rather, the primary purpose of this summary is to present some concepts in a simplified form as a prelude to the more detailed description that is presented later. The invention provides methods and apparatus by which the above shortcomings associated with a multiplicity of sector select circuits can be mitigated or overcome.

In accordance with one aspect of the disclosure, a memory buffering system comprises a plurality of clients, a transfer bus, and a unified memory controller (UMC). The UMC comprises a unified host buffer and a request queue. The UMC arbitrates bus ownership for the plurality of clients and the plurality of clients are coupled together in chain architecture and configured to the unified host buffer in a series bus configuration. The plurality of clients also comprises a plurality of memory elements.

In another embodiment of the disclosure, a memory buffering system comprises a plurality of memory elements, and a UMC. The UMC comprises a unified host buffer, a counter, and a request queue. The UMC allocates bus ownership for the plurality of memory elements. Furthermore, the plurality of memory elements is configured in parallel in a shared bus configuration.

In yet another embodiment of the disclosure, a communication device, comprises a flash memory CPU wherein the flash memory is operatively coupled to the CPU and configured to transfer data to and from the CPU. The device further comprises an input component for entering the data, a display component or displaying information, a plurality of switches, flash memory, and a memory buffering system. The memory buffering system comprises a plurality of clients, a transfer bus, and a UMC. The UMC comprises a unified host buffer and a request queue. The UMC arbitrates bus ownership for the plurality of clients and the plurality of clients are coupled together in a chain architecture and configured to the unified host buffer in a series bus configuration. The plurality of clients further comprises a plurality of memory elements and a plurality of slave controllers coupled to the plurality of memory elements. The plurality of memory elements further comprises a nonvolatile memory or a volatile memory or both the nonvolatile memory and the volatile memory. The UMC arbitrates bus ownership according to both a time division multiple access (TDMA) scheme and a priority based scheme. The priority based scheme comprises at least one chip select in the chain architecture and the volatile memory is a NAND or NOR memory and the volatile memory is a DRAM memory.

In yet one other embodiment of the disclosure, a communication device comprises a flash memory CPU, the flash memory operatively coupled to the CPU and configured to transfer data to and from the CPU. The device further comprises an input component for entering the data, a display component for displaying information, a plurality of switches, flash memory, and a memory buffering system. The memory buffering system comprises a plurality of memory elements and a UMC. The UMC comprises a unified host buffer, a counter, and a request queue wherein the UMC allocates bus ownership for the plurality of memory elements. The plurality of memory elements is configured in parallel in a shared bus configuration and comprises a nonvolatile memory or volatile memory or both a nonvolatile and volatile memory. The nonvolatile memory is a NAND or NOR memory and the volatile memory is a DRAM memory. The UMC arbitrates bus ownership by a priority scheme comprising, at least one chip select and at least one shared bus.

To the accomplishment of the foregoing and related ends, the following description and annexed drawings set forth in detail certain illustrative aspects and implementations of the disclosure. These are indicative of but a few of the various ways in which the principles disclosed may be employed. Other objects, advantages and novel features of the invention will become apparent from the following detailed description when considered in conjunction with the drawings.

BRIEF DESCRIPTION OF THE DRAWINGS

FIG. 6 is an illustration of yet another aspect of the hybrid arbitration scheme;

FIGS. 9a and 9b, is an illustration of one example of command execution time in accordance with one embodiment of the present disclosure.

DETAILED DESCRIPTION OF THE INVENTION

Figure 1:
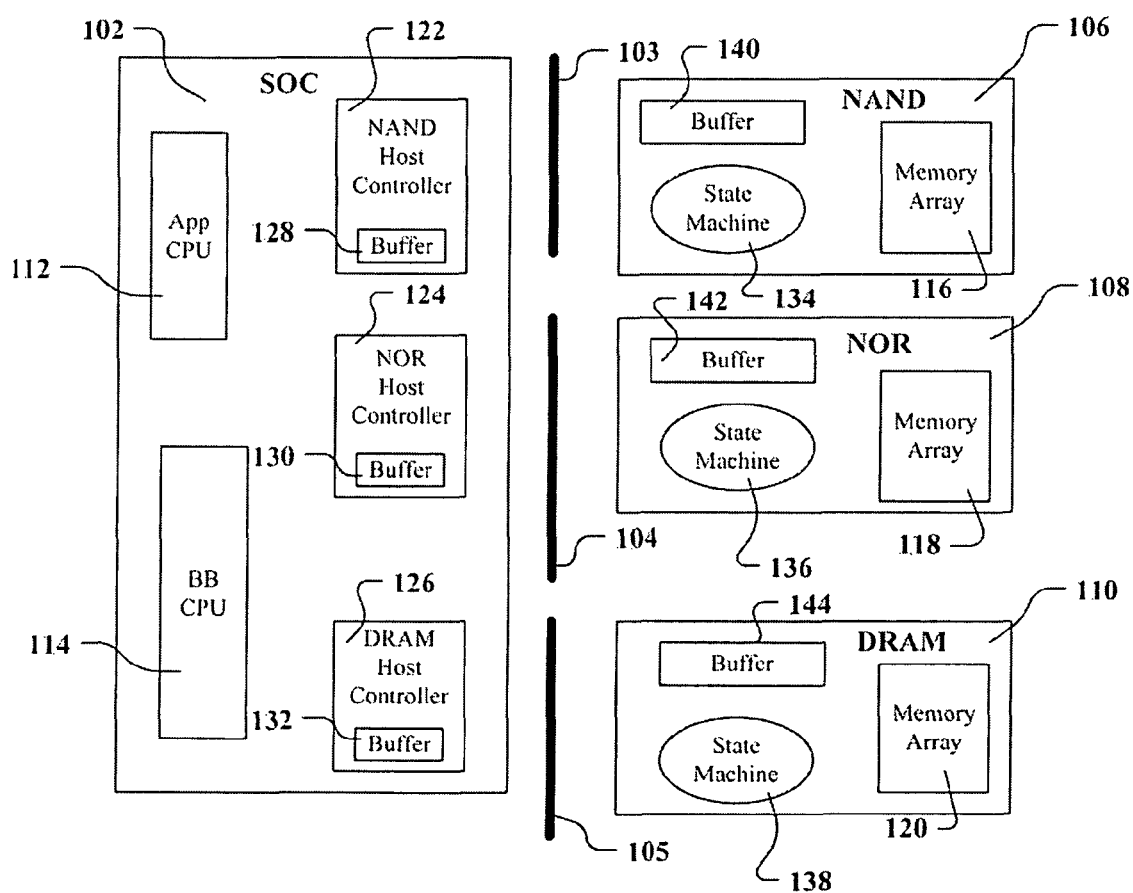
FIG. 1 is an illustration of an architecture for a memory buffer system in accordance with prior art.

One or more implementations of the present invention will now be described with reference to the drawings, wherein like reference numerals are used to refer to like elements throughout. In some instances, the terminology and symbols may imply specific details that are not required to practice the invention. For example, the interconnection between circuit elements or circuit blocks may be shown or described as multi-conductor or single conductor signal lines. Each of the multi-conductor signal lines may alternatively be single conductor signal lines, and each of the single conductor signal lines may alternatively be multi-conductor signal lines. Signals and signaling paths shown or described as being single ended may also be differential, and vice-versa. The present disclosure is directed to a memory buffering system that enables the reduction of PIN count, cost, and increase operating frequency by connecting memory(s) in a chain stricture and fairly allocating bus resources to a plurality of clients comprising host destination pairs.

Referring now to FIG. 1, a conventional architecture for a memory buffering system 100 is illustrated as an example that may be utilized in mobile systems. The memory buffering system 100 illustrates an integrated system on a chip (SOC) 102 coupled to memory transfer buses 103, 104, and 105. Integrated on the SOC 102 is an application computer processing with (CPU) 112 and a big brother CPU 114 in addition to three different memory host controllers 122, 124, and 126. Transfer buses 103, 104, and 105 are coupled to a parallel bus configuration of memory elements 106, 108, and 110, respectively. Each of the memory elements 106, 108, and 110 are coupled to one of the three dedicated host controllers 122, 124, and 126, respectively. A memory element may be a memory cell and/or a memory array and/or memory device of various sizes for purposes of this, disclosure. Control pins (not shown) located on each of the host controllers 122, 124, and 126 are coupled, to the memory elements 106, 108, and 110 via a collection of parallel lines or the transfer bus 103, 104, and 105, respectively. The buses 103, 104, and 105 transport data, such as CPU commands for reading or writing memory.

In the example of prior art of FIG. 1 the memory elements 106, 108, and 110 are NAND, NOR, and DRAM type memories respectively of a mobile platform, such as a mobile phone system. Each host controller 122, 124, and 126 comprises a buffer 128, 130, and 132 for temporarily holding memory transported from the NAND, NOR or DRAM type memory elements 106, 108, or 110. The NAND, NOR, and DRAM type memory elements 106, 108, or 110 each comprises a respective buffer 140, 142, and 144 which usually functions to store data from a memory array 116, 118 or 120 as it is retrieved or functions to move data between processes within the memory system 100. In telecommunications in particular, the buffer 140, 142, and 144 acts as a routine or storage medium to compensate for a difference in a rate of flow of data, or time of occurrence of events, when transferring data from one device to another, for example from the NAND type memory array 116 to the NAND host buffer 140 from the transfer bus 103.

The bus delay (i.e. the time to transfer data from a host buffer to a memory buffer) is very short for all the memories. Because DRAM is the fastest from NOR, NAND, and DRAM type memories and has the characteristics of symmetrical read/write performance, the internal memory delay (i.e. the time to transfer data from the memory buffer to a memory array) is very short for DRAM, but fairly larger for NAND and NOR type memory. A DRAM at 166 MHz, for example, could achieve a bandwidth in a range of about 2 GB/sec. However, NOR and NAND type memories could achieve a bandwidth in the range of about 10 to about 100 MB/sec. Consequently, the challenge of integrating DRAM with NOR and NAND type memories is to avoid compromising the indispensability of DRAM while accommodating the need to utilize NAND and NOR functionalities.

Such systems, as system 100, may offer the advantage of extremely fast signaling rates, but not without challenges, some of which are surmounted by the present disclosure. For example, some of the challenges to such an exemplary parallel configuration are the cost of more complex and limited expandability. Therefore, as each new memory device is added to the system 100, additional input/output (I/O) pins and corresponding I/O circuitry (not shown) are consumed within the memory controllers 122, 124, and 126, so that for a given generation of memory devices the maximum storage capacity of the memory system 100 can be limited by the memory controller 122, 124, or 126 itself.

Figure 2:
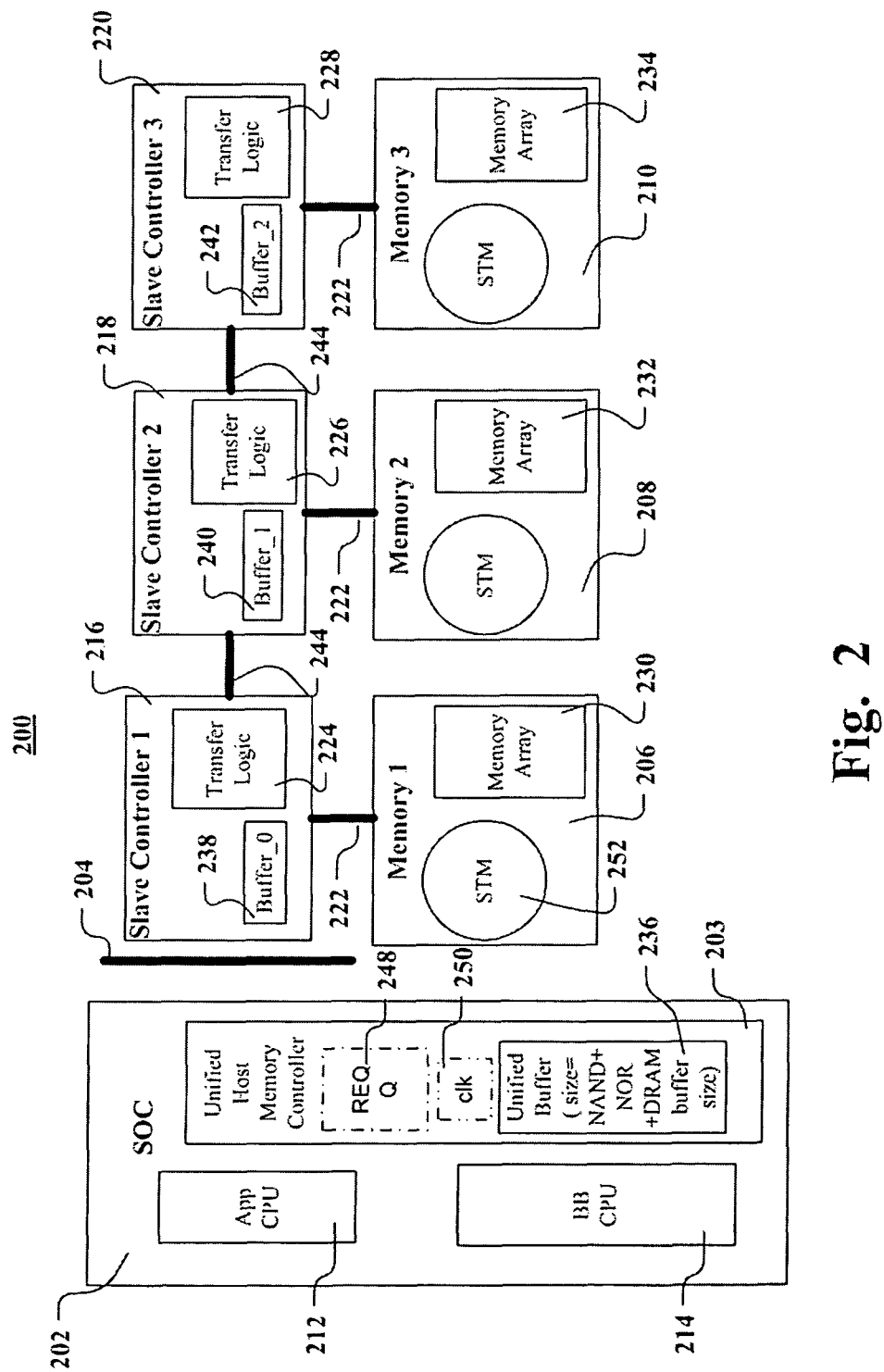
FIG. 2 is an illustration of a chain architecture for a memory buffering system in accordance with one embodiment of the present disclosure.

Some of the challenges discussed above are surmounted by a memory buffering system 200 illustrated in FIG. 2 configured in chain architecture as one embodiment of the disclosure. In the buffering system 200 of one embodiment of the disclosure, memory 1, 2, and 3 devices 206, 208, and 210 are chained together in series via buses 244 to form a series bus configurations and configured to a unified host memory controller (UMC) 203 via transfer bus 204. The memory devices 206, 208, and 210 are coupled to respective slave controllers 216, 218, and 220 to form a host-client pair. Each host-client pair are coupled one to another in a chain, with the initial memory device 206 and slave controller 216 pair of die chain being coupled to the UMC 203 in a series bus configuration. A parallel link transmits several streams of data (perhaps representing particular bits of a stream of bytes) along multiple channels (wires printed circuit tracks, optical fibers, etc.); a serial link transmits a single stream of data. By this structure, each additional memory device is coupled to the system via a bus in series, thereby enabling high integrity, high speed access with a system expansion path that does not compromise data throughput or consume additional pins on the memory controller. Commands and data received within a given memory device 206, 208, or 210 are retransmitted to a subsequent memory device in the chain after a brief storage in a corresponding buffer 238, 240, and 242 of a slave controller 216, 218, or 220. By this operation, commands and data propagate rapidly, through the chain of memory devices so that the signaling latency introduced by the chain topology is kept low in proportion to the data access latency within the memory devices themselves. These memory devices may also be considered memory elements that comprises one memory cell and/or memory arrays and/or memory devices of various size. In contrast to the prior art memory systems described in reference to FIG. 1, the chain of memory devices 206, 208, 210 in FIG. 2 may be readily expanded in a series, increasing capacity of the memory buffering system 200 without loss of signaling quality and without consuming additional I/O pins and circuitry on the memory controller because they are arranged in a series bus configuration to one another with the first memory coupled to the bus 204 and UMC 203.

Commands sent to target memory devices 206, 208, and 210, for example, include data read and write commands, erase commands, parameter query commands, status requests and command any other action indicated by the device parameter information to be within the capability of the target memory devices. In one embodiment, memory read operations involve transmission of separate data-read and data pickup commands; that is, the memory controller issues a data read command to a target memory device 206, 208, or 210 (or target group of memory devices) specifying a number of data values be read from a specified address within the memory device. The memory device 206, 208, 210, in response, retrieves the data values from the storage array and stores the data values in the output buffers 238, 240, and 242 pending receipt of a data pickup command. After issuing the data read command, the memory controller 203 delays for a period of time long enough for the data retrieval to be completed within the target memory device (e.g., as specified by the corresponding, device parameter information), then issues a data pickup command that specifies the number of retrieved data values to be output from the target memory device. The target memory device receives and retransmits the data pickup command, appending the specified number of retrieved data values to the end of the data pickup command. Through this protocol, the transmission of read data on the signaling path is controlled entirely by the memory controller 203 in each instance, thus simplifying the interface control circuitry within the individual memory devices. Consequently, no circuitry for controlling response latency or burst length (the number of values to be transmitted in response to a read command) or for arbitrating access to the output signal path need be provided within the individual memory devices.

FIG. 2 further illustrates the memory buffering system 200 on a chip according to an embodiment of the invention. The system on a chip 202 includes an application CPU 212 and a big brother CPU 214 in addition to the set of memory devices 206, 208, and 210 coupled to respective slave controllers 216, 218, and 220. The memory devices 206, 208, and 210 are coupled to respective slave controllers 216, 218, and 220 to form a host-client pair. Each host-client pair are coupled one to another in a chain, with the initial memory device 206 and slave controller 216 pair of the chain being coupled to the UMC 203 in a series bus configuration. The memory devices 206, 208, and 210 each include a signaling interface 222 and a storage array 230, 232, 234, the signaling interface 222 being used to receive and transmit data and commands propagating through the chain of memory devices, and the storage array 230, 232, 234 (which may include multiple storage arrays) being used for data storage. While the memory devices 206, 208, and 210 are generally described below as having semiconductor storage arrays 230, 232, and 234, respectively (e.g., including, but not limited to, volatile storage arrays such as static random access memory arrays (static RAM) and dynamic RAM arrays, nonvolatile storage arrays such as programmable read only memory (PROM), erasable PROM (EPROM), electrically erasable or alterable EPROM (EEPROM), flash EEPROM, thyristor-based memory devices (so-called negative-device-resistance storage devices) and so forth), the storage arrays 230, 232, and 234 may alternatively be formed using other media including, without limitation, various forms of magnetic and optical media. Also, the storage arrays 230, 232, and 234 within the memory devices 206, 208, 210 need not be homogeneous. Rather storage arrays of different types (e.g., different underlying storage media) and/or capacity may be provided in different memory devices of the chain, thereby enabling diverse memory systems to be constructed according to application needs and yet with a single point of access and control (i.e., separate memory controllers for the various storage types are not needed).

The memory controller 203 is coupled to the transfer bus 204 having an output coupled to an input of the initial slave controller 216 paired with the memory device 200 pair in the chain. The memory controller 203 also includes a host interface 222 to receive memory access requests, addresses and write data from, and to transmit read data and status information to, one or more host devices (not shown) such as a processor, application-specific integrated circuit (ASIC), video controller, direct memory access controller and/or other device capable of issuing memory access requests. The UMC 203 may be formed in a discrete integrated circuit (IC) or, alternatively, in an integrated circuit device that includes the host device or other circuit blocks (e.g., in a chipset that includes a bus bridge, graphics port and processor interface, or in a system-on-chip). Also, the memory controller IC may be packaged with other ICs in various types of multi-chip packages (e.g., multi-chip modules, stacked packages, paper-thin packages, etc.). For example, in one embodiment, the entire memory buffering, system 200 including the UMC 203 and the chain of memory devices 206, 208, 210 with slave controllers is packaged in a multi-chip package.

In one embodiment of FIG. 2, commands and data output from the unified memory controller 203 to the chain of memory devices 206, 208, 210 travel in a direction, first being received at the initial slave controller 216 memory device 206 pair and then being retransmitted to the next slave controller memory device pair in the chain (i.e., 218 and 208) which receives and retransmits in the same manner. By this operation, commands and data propagate through the chain of memory devices 206, 208, 210, being received and retransmitted by each memory device 206, 208, 210 in turn, until being returned to the memory controller 203.

For example, the memory array 234 contained within memory 3 (210) is able to utilize the individual buffer_2 (242) of slave controller 3 (220). In one embodiment of the disclosure, if all other buffers are free the UMC 203 can allocate the buffers 240 and 238 in addition to the unified host buffer 236, which is the size of NAND, NOR and DRAM memory buffers. In another embodiment of the disclosure, when memory_2 (208) is accessed based on the status of a state machine 252 then the memory is transferred based on an id select or chips, select (not shown) of the bus 244, for example.

The UMC 203 will determine where memory transfers will be made to or to which destination the transaction will be stored. Because the id select is for memory_2 (208), the transaction will be transferred through bus 204 to the first controller, namely slave controller 1 (216). Slave controller 1 (216) will examine the id select in the transfer logic 224 and see that the transfer is for an id select or chip select of memory number 2. The slave controller 1 (216) will apply the transfer to the memory connected to it, namely buffer_0 (238). Likewise, each memory within the chain is able to utilize the resources or memory buffers of buffers prior to it in the chain, including the unified host buffer 236.

In another embodiment, the signaling path between adjacent slave controllers 216, 218, and 220 via link 244 (and between the UMC 203 and a memory device) is formed by a set of electrical signal conductors such as printed circuit traces (e.g., disposed on a substrate to which the memory devices are mounted), electrical cables (e.g., micro-coaxial cables, twin-axial cables, twisted-pair cables, flex cables, and so forth). In an alternative embodiment, the signaling paths may be established by direct contact between contacts or other interconnect structures disposed on adjacent memory devices (e.g., the memory devices being disposed such the contacts of adjacent memory devices abut one another to establish electrical contact). In yet other embodiments, fiber optic cables may be used to form the signaling paths between the memory devices and memory controller, or the signaling paths may be omitted altogether (or in part) and wireless connections used to establish communication links between adjacent devices (e.g., using infrared, radio-frequency or other wireless signaling technology) and/or, between the memory controller and memory devices.

In another embodiment of the present disclosure all memory accesses are controlled by the UMC 203 which comprises a unified butler 236. The unified buffer 236 in the host controller 203 can be utilized for any memory device 206, 208, 210 in the chain on demand. For example, the last memory 210 in the chain is able to utilize all three slave controller butlers 238, 240 and 242 and the unified host buffer 236. For example, if a picture is being stored in a NAND type memory in the memory 3 device 210, the unified host buffer 236, buffer_0, buffer_1, and buffer_2 (i.e. 238, 240, and 242, respectively) can be utilized for temporary storage. This improves performance and reduces the possibility of buffer overflow which contributes to high latency. Similarly, in another example memory_2 (208) could utilize the unified host buffer buffer 236 and buffer_1 (240) and buffer_0 (238). Transfer logic 224, 226, and 228 transfers memory via a bus link 244 in a transaction to the next slave controller based on the UMC 203 scheduling a chip select (not shown) associated with each bus transfer from the UMC 203. The transfer from one slave/memory client pair to the next is controlled by each slave controller 216, 218, 220 maintaining a statistics of free buffer space and updating each chain connected to it upon reaching a predetermined water mark as discussed infra. The time to transfer a transaction from one slave controller 216, 218, 220 to the next is insignificant compared to the time it requires to write to or read from the memory array 230, 232, and 234. This ensures that there is no performance penalty for a transaction going through the chain 200.

In accordance with another embodiment of the invention, the UMC 203 utilizes a hybrid arbitration transfer scheme for client pairs coupled in the chain architecture of FIG. 2. The UMC 203 schedules usage of shared resources, i.e., the unified host buffer 236, and slave controller buffers 238, 240,242 of FIG. 2. Each client sends a request to the UMC 203 which is stored in a request queue 248. A particular challenge for the chain topology illustrated as one example in FIG. 2, is how to efficiently allocate the bus 204 ownership to a particular host-client destination pair (e.g., Host-DRAM, HOST-NOR, etc.) so that all the clients in the chain get a fair amount of time in the bus. The present inventors contemplated a UMC 203 that comprises a hybrid arbitration scheme for both low traffic conditions and high traffic conditions as explained in detail below.

In one embodiment of the disclosure, the UMC 203 operates in a synchronous manner in that the UMC 203 receives request signals within the request queue 248 for resources at the same time from the various slave controller/memory pairs called client destination pairs using the clock counter 250. Scheduling happens synchronously in that grant signals flowing through various chips selects (not shown) are sent at the same time and the usage interval for each resource has the same length. In another embodiment, scheduling can be constrained in that only one requester can use a particular resource at the same time. When developing an arbitration scheme the goal is to achieve high aggregate usage of the resources while still providing a minimum, level of fairness in the sense that starvation of individual requests is prevented.

The UMC 203 of FIG. 2 controls access to the unified host buffer 236. The UMC 203 receives memory access requests from several different clients into the request queue 248. Furthermore, the UMC 203 decides which memory accesses should be made by which components and when, based oil the arbitration scheme chosen by the UMC 203.

Figure 3:
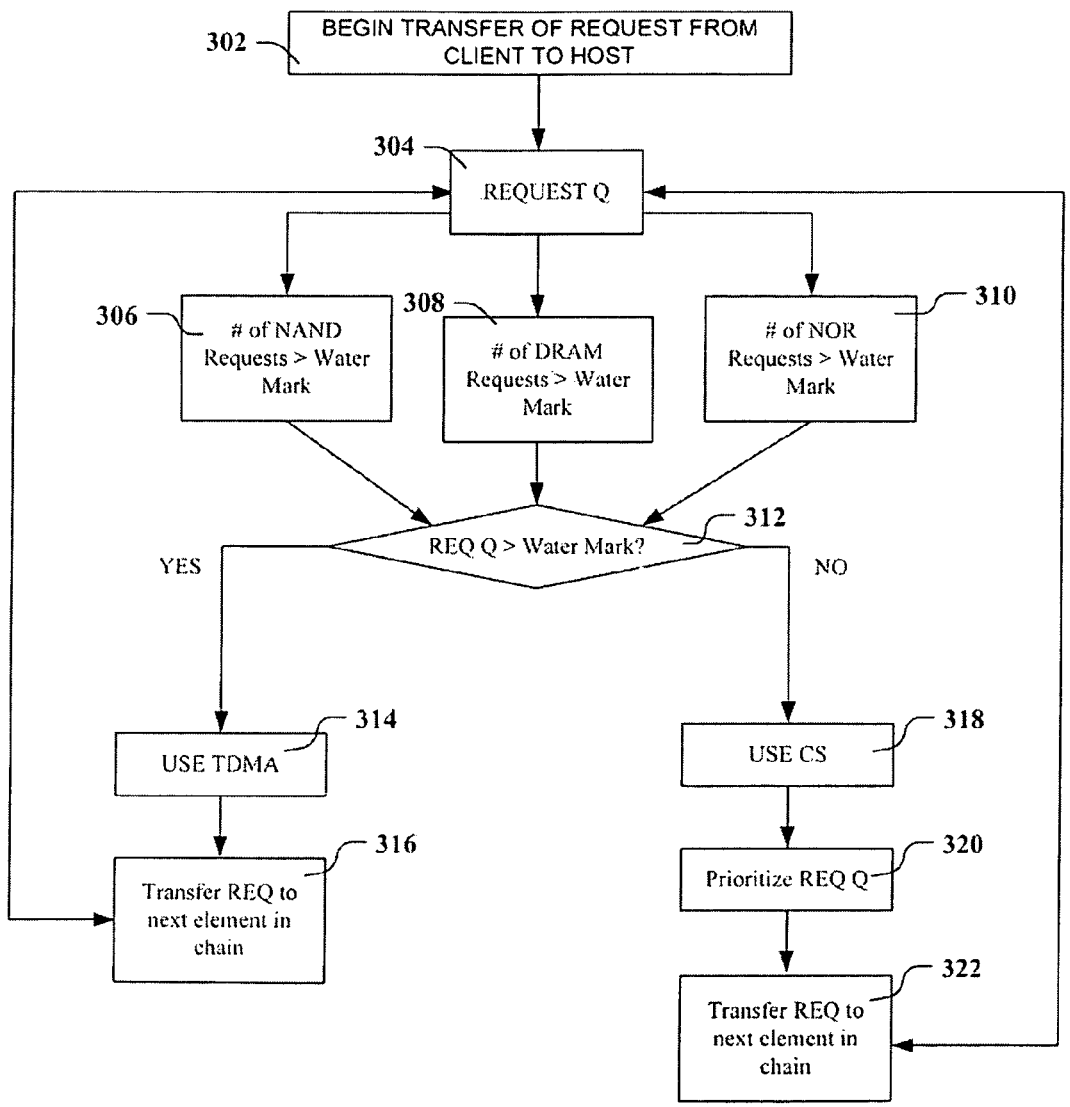
FIG. 3 is an illustration of a hybrid arbitration scheme in accordance with one embodiment of the present disclosure.

FIG. 3 is an example of a hybrid arbitration scheme 300 utilized by the unified memory controller 203 of FIG. 2. High traffic or high request conditions oftentimes will occur when NOR and NAND memories initiate request for resources in conjunction with the DRAM memory. Upon reaching a predetermined water mark level arbitration logic chooses between a resource allocation scheme, either a Time Division Multiple Access (TDMA) or a Chip Select scheme by which system resources are shared. For example, each client sends a request to the UMC 203, which then chooses the requests to be granted such that resources in the from of the buffers 236, 238, 240, and 242 and/or ownership of the single transfer bus 204 are allocated to each client in a conflict free manner according to the scheme chosen.

Illustrated in FIG. 3 is an example of the hybrid arbitration scheme 300 for allocating system resources for memory clients comprising destination pairs or slave controller/memory pairs in accordance with one or more embodiments of the present disclosure. The hybrid arbitration scheme 300 of FIG. 3 will be described in conjunction with FIG. 2 in order to facilitate an understanding of this embodiment. The scheme 300 begins at 302 where a request is transferred from a client to the UMC (HOST) into request queue 248 at 304. In one embodiment of the disclosure the UMC 203 allocates ownership of the single bus 204, the unified host buffer 236 and slave controller buffers 238, 240, and 242 to read and write memory, and also to cause interrupts.

In another embodiment of the disclosure, the single bus 204 comprises a request path that can be asserted by one or more devices at any time. The bus 204 is both an address bus and a data bus in one combined bus 204. In contrast to the prior art of FIG. 1 where three different busses are dedicated to each type of memory device, the bus 204 is a single bus that combines pins in order to decrease the number of pins used. For example, the number of pins may be about 100 pins. Depending on the amount of memory configured in the architecture or bandwidth needed, the bus 204 may comprise 40 pins for a 16 bit address and 16 bits of data, in addition to some other controller pins.

For example, at 304 of FIG. 3 when the UMC 203 sees a bus request it may issue a grant, depending on the specific allocation scheme by asserting the grant through a bus grant signaling path (not shown). This bus grant path is interconnected through all the clients in chain architecture. When the client sees the grant, it can check to see if it made a request for bus ownership. If so, it takes over the allocated bus ownership but does not propagate the grant further down the line. If it has not made a request, it propagates the grant to the next client in line, which behaves the same way, and so on until some client accepts the grant and takes the bus ownership allocated to it depending on the type of arbitration scheme utilized by the UMC 203.

At the REQ Q 304, high traffic or high request conditions oftentimes will occur when NOR and NAND memories initiate request for resources in conjunction with the DRAM memory. Upon reaching a predetermined water mark level, arbitration logic chooses between a resource allocation scheme, either a Time Division Multiple Access (TDMA) or a Chip Select (CS) scheme by which system resources are shared. For example, each client sends a request to the UMC 203, which then chooses the requests to be granted such that resources in the form of the buffers 236, 238, 240, and 242 and/or ownership of the single transfer bus 204 are allocated to each client in a conflict free manner according to the scheme chosen. Each request is stored in the REQ Q 304 of the UMC 203.

In another embodiment of the disclosure, three counters within the UMC 203 (not shown) comprise NAND, NOR, and DRAM counters at 306, 308, and 310, respectively. Each slave controller 216, 218, and 220 comprises a queue (not shown) of request whereupon the number of request reach a certain threshold value or water mark value a request is sent to the UMC 203 request queue 248. The counter dedicated to each memory type will increment for each type of memory request. Therefore, based on the queue at the UMC it can be determined how many request are being made from each type of memory over a specific period of time. In this manner bus pins may be allocated based on the number of requests being made and the allocation scheme for high traffic conditions or low traffic conditions. The demand for bus allocation by NOR or NAND is typically 12% to 24% of the demand for DRAM, for example. Therefore, the water mark for the UMC 203 at 312 will be lower than the water mark level for the NAND, NOR, and DRAM, request queues at 306, 308, and 310 respectively. For example, if the water mark level for the NAND, NOR, and DRAM request queues at 306, 308, and 310 respectively is twelve, then the water mark for determining whether the TDMA arbitration scheme or the CS arbitration scheme is utilized will be about six.

At 312 the UMC 203 implements a decision to arbitrate resources according to a TDMA based scheme or a CS based scheme. If the water mark for the request queue 248 of the UMC is reached then the TDMA scheme will be implemented to provide a higher aggregate usage of the shared resources while still providing a minimum level of fairness. If traffic conditions are high, i.e. The number of request for bus ownership is above the water mark level for the request queue 248 of the UMC 203, TDMA is utilized at 314 and then at 316 the request is transferred to the next element in the chain based on the amount of resources needed and scheme type. An example of a request in the form of a NAND type memory used for data is a picture for storage. Other functions that may cause a TDMA arbitration to be chosen may be a data application being loaded into the mobile phone which utilizes the NOR device. Any real time video or streaming, for example, will implement DRAM memory.

If traffic conditions are low, i.e. The number of request for bus ownership is below or equal to the water mark level, then the CS scheme is used at 318. The scheme is typically utilized when the number of DRAM request are not in conjunction with a large number of NAND and/or NOR request. Because DRAM is the fastest of the NOR, NAND, and DRAM type memories and has the characteristics of symmetrical read/write performance, the internal memory delay (i.e. The time to transfer data from the memory buffer to a memory array) is very short for DRAM, but larger for NAND and NOR type memory. A DRAM at 166 MHz, for example could achieve a bandwidth in a range of about 2 GB/sec. However, NOR and NAND type memories could achieve a bandwidth in the range of about 10 to about 100 MB/sec. Consequently, the challenge of integrating DRAM with NOR and NAND type memories is to avoid compromising the indispensability of DRAM while accommodating the need to utilize NAND and NOR functionalities. When large number of NAND and NOR request are not being made then it is more efficient to utilize the CS scheme of arbitration. Prioritizing the REQ Q occurs at 320 as part of the CS scheme further explained in detail below. At 322 the request is transferred to the next element in the chain and transferred back to the request queue or REQ Q at 304 when another request is made.

Figure 4:
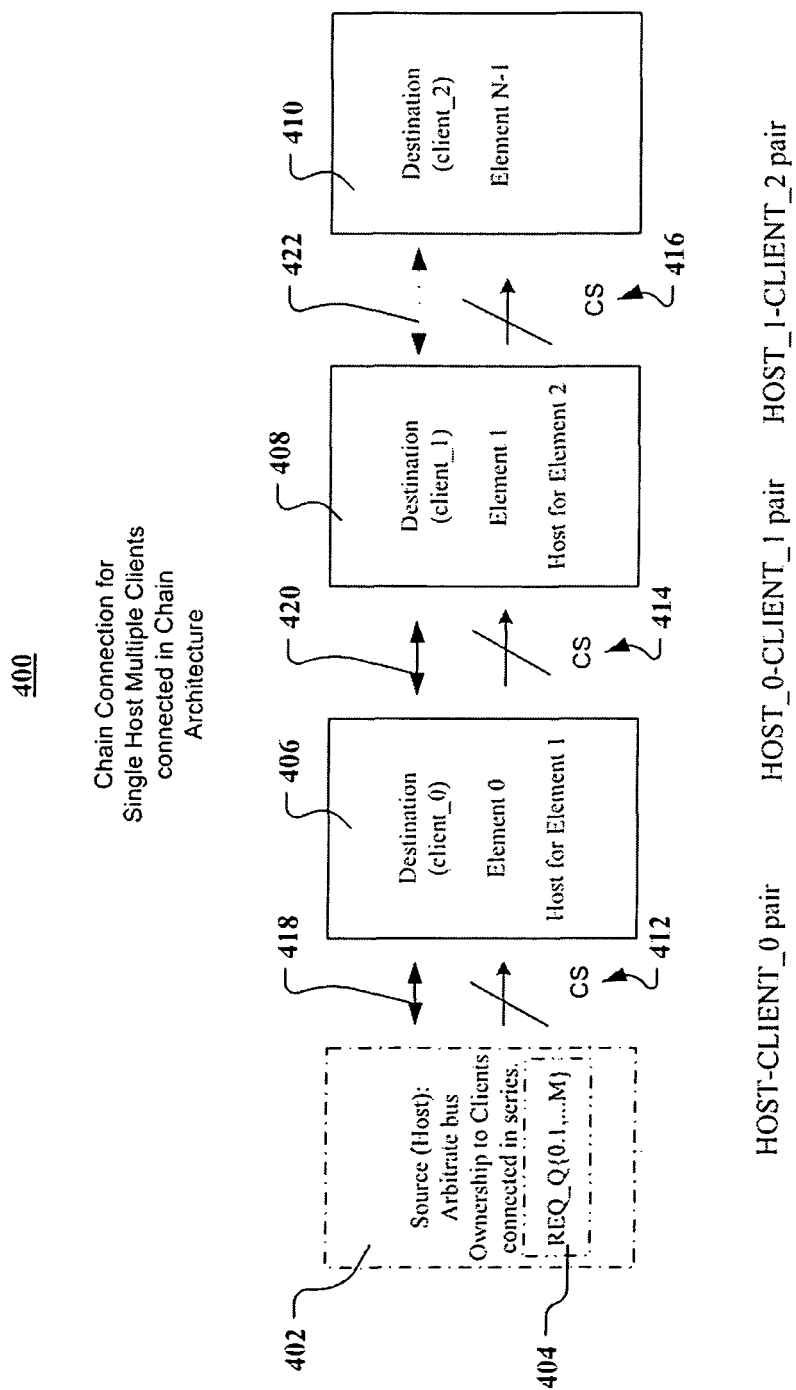
FIG. 4 is an illustration of one aspect of the hybrid arbitration scheme of the present disclosure.

Turning, now to FIG. 4, a more detailed description of the CS scheme at 318 of FIG. 3 is illustrated as one embodiment of the disclosure. The chip select scheme utilizes the request queue of the UMC for DRAM, NOR or NAND to determine the manner in which the unified buffer and additional resources are shared. The unified buffer temporarily stores memory being transferred, but if the buffers of other slave controllers are empty their buffer resources are shared as well. For example, the UMC 203 of FIG. 2 receives requests for the unified host buffer 236 which is the size of all three memory buffers combined and therein reduces pin count.

FIG. 4 illustrates the unified host memory controller 400 designated as source (Host) 402. FIG. 4 illustrates the process by which the Host 402 arbitrates bus resources to clients 406, 408, and 410 coupled in series. The Host 402 comprises a clock (not shown) and a request queue 404 represented by REQ_Q {0, 1, ... M} wherein M represents any total number of request made for transfer buses 418, 420, and/or 422 to be utilized. The manner by which bus resources 418, 420, and 422 get utilized is through chip selects (CS) 412, 414, and 416. Alternatively, the chip selects can be called slave selects or id selects. Chip selects 412, 414, and 416 designate a control line used to select one clip out of the several exemplary chips 412, 414, and 416 connected to the same bus.

Additional chip selects are also contemplated as being within the embodiments of this disclosure in correspondence to additional slave controller/memory client pairs coupled in series. Different types of logic may be utilized within the transfer logic blocks 224, 226, and 228 of FIG. 2 in which chips selects 412, 414, and 416 may be utilized. The present disclosure does not limit to any logic type, in particular. A common type of logic is called three-state logic to utilize a chip select for a serial peripheral interface bus. However, an type of bus mat be utilized in conjunction with a variety of chip select logic blocks as contemplated by this disclosure as a means to couple several or more devices in series and retain the ability to send data or commands to each particular device independently of the others coupled to any particular bus.

When the chip select 412, 414, or 416 is held in an inactive state, the chip or device is "deaf," and therefore, pays no heed to changes in the state of its input pins. Alternatively, when the chip select 412, 414, or 416 is held in an active state, the chip or device assumes that any input changes it "hears" are meant for it in particular. In response to such an active state the particular chips select responds as if it is the only chip on the bus 418, 420, or 422. In short, the chip select is an input-enable switch. "On" means the device responds to changes on its input pins (such as data or address information for a particular NAND, NOR, or DRAM device), while "Off" tells the device to ignore the outside environment.

For example, destination client_2 (410) of FIG. 4 represents the slave controller 3 (220) and memory 3 (210) client pair of FIG. 2. Additional client pairs may be coupled in series in the chain architecture of the present embodiment of the disclosure, however the three depicted are only meant to illustrate one embodiment of the disclosure for simple explanation. Each client, for example, client_1 (408) and client_0 (406) represent a particular slave controller coupled to the corresponding memory. When destination client_2 is accessed the Host 402 allocates an adjacent bus 422, for example, to be owned or accessed according to the specific, chip, select or CS 412,414, and 416 turned on. For example, host 402 comprises N number of clients and needs to schedule bus ownership of bus 418,420, or 422 of the host-client pair for N number of clients. Host_0 has N-1 number of clients and needs to schedule bus ownership of Host_0-Client_1 pair for N-1 number of clients. In this manner each memory client 410, 408, and 406 is able to utilize the bus 422, 420, and 418 in order make use of the buffer resources of each adjacent clients downstream of the Host 402 (i.e., towards the Host 402 from any one client) including the unified buffer 236 of the UMC 203 (not shown in FIG. 4).

Referring again to FIG. 2, the transfer logic 228 contained within the memory corresponding to memory_3 (210) of FIG. 2 is able to utilize the individual buffer_2 (242) of slave controller 3 (220) based on the chip select 416. In one embodiment of the disclosure, if all other buffers are free. The UMC 203 may allocate the buffers 240 and 238 in addition to the unified host buffer 236, which is the size of all NAND, NOR and DRAM memory buffers. In another embodiment of the disclosure, when memory_2 (208) is accessed based on the status of the state machine 252 then the memory is transferred based on an id select or chips select within the bus 244 of FIG. 2, for example. The UMC 203 will determine where memory transfer will be made to or to which destination the transaction will be stored. Because the id select is for memory_2 (208), the transaction will be transferred through bus 244 to the next controller, slave controller 1 (216). The next controller, slave controller 1 (216) will examine the id select in the transfer logic 224 and see that the transfer is from an id select or chip select for memory number 2. The slave controller 1 will apply the transfer to the memory connected to it, namely buffer_0. Likewise, each memory within the chain is able to utilize the resources or memory buffers of buffers prior to it in the chain, including the unified host buffer 236.

Figure 5:
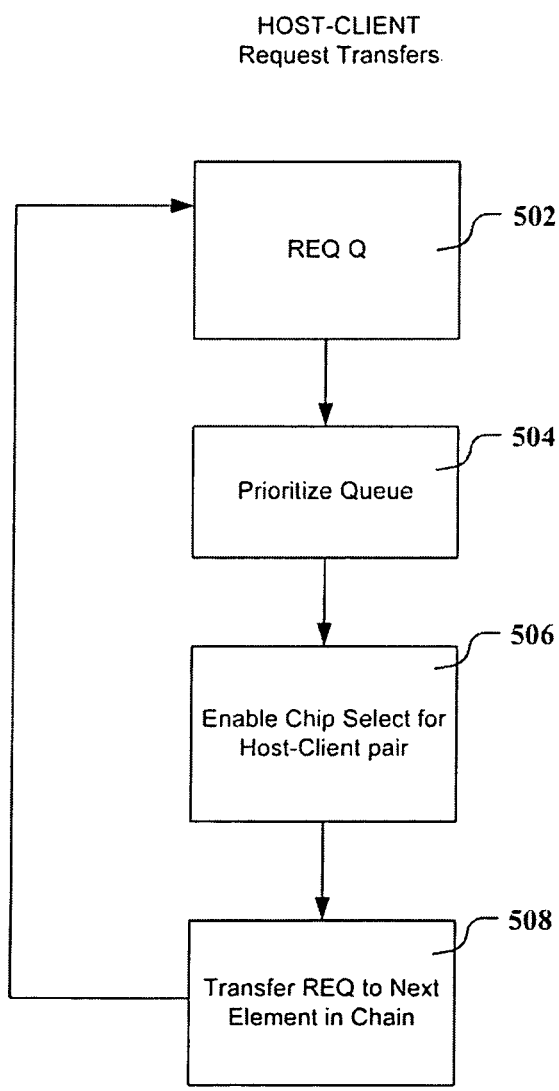
FIG. 5 is an illustration of another aspect of the hybrid arbitration scheme of the present disclosure.

Turning now to FIG. 5 is one embodiment of the disclosure illustrating a CS scheme 500 implemented by the UMC (not shown) when traffic conditions are low or request for bus access is below a predetermined watermark level. At 502 a REQ Q comprised within a unified memory host controller stores request for bus access as they are received. The UMC prioritizes the request queue after each transfer to the next element in the chain so that an update is consistently being made. The prioritizing of the REQ Q at 514 can be made based on any number of selective factors. In one embodiment of the present disclosure priority is made based on the type of memory requesting access and an increment counter configured to each slave controller and corresponding NOR, NAND and/or DRAM memory client pair (not shown). At 506 the UMC enables a particular chip select for any particular Host-Client pair to utilize bus access. At 508 transfer of the REQ is made to the next element in the chain if that request is not for the particular chip select. Thereafter, any additional request is returned to REQ Q at 502.

FIG. 6 depicts an example of a Time Division Multiple Access (TDMA) scheme 600 that may be utilized when traffic is high or when request for bus access surpasses a predetermined watermark level and the need for a more adequate allocation of buffer resources is needed in order to prevent buffer overflow. By utilizing a TDMA scheme multiple accesses to a memory bus are able to co-exist and the sharing of individual buffers can occur in conjunction with the unified buffer comprised by the UMC. A memory clock or counter within the UMC drives clock cycles that are specifically assigned to each type of memory. For example, if three devices comprising NOR, NAND, and DRAM memories are seeking access, then clock cycles 1, 2, and 3 can be assigned to DRAM memory, clock cycle 4 to NOR memory and clock cycle 5 to NAND type memory. However, any combinations of clock cycle designations can be programmed according to demand for buffer access and buffer space required. After cycling through each cycle for all memories the clock returns to a double data rate (DDR), for example. In bus operation with DDR the bus transfers data on both the rising and falling edges of the clock signal. This is also known as double pumped, dual-pumped, or double transition. One means to design a clocked circuit is to make it perform one transfer per cycle (i.e., rise and fall) of a clock signal. This, however, requires that the clock signal operate twice as fast as the data signals, which change at most once per transfer. When operating at high speed, signal integrity limitations can constrain the clock frequency. By using both edges of the clock, however, the data signals operate at the same limiting frequency, doubling the transmission rate. An alternative to DDR is to make the link self-clocking.

By implementing a hybrid arbitration scheme the benefits of both CS priority schemes and TDMA schemes are taken. For example, if there is a request for any element in the chain of FIG. 4 that gets the lowest priority depending on the number of outstanding request for other clients with higher priority, any element in the chain could experience very high initial latency penalty. However, in combination with TDMA, where each client relative to a given host in the chain is given a fixed amount of bus ownership the latency penalty is reduced significantly. The time allocation could be determined by the nature of expected demand for a client and/or the bandwidth that a client can provide. For example, in FIG.

6 a system is depicted at 602 wherein there are DRAM, NOR, and NAND within the memories of the chain. In one embodiment of the disclosure a reasonable time allocation scheme could be three cycles for DRAM, one for NOR and one cycle for NAND. At 602 the host UMC shares resources allocated to client 0 wherein clock cycles 1, 2 and 3 are being allocated to DRAM memory for bus ownership of the buffer system. At 604 Host_0-Client_1 pair depicts an example of NOR and NAND combinations being utilized for the different clock cycles of Host_0-Client_1 which corresponds to the trust client_0 slave controller/memory device pair 406 being considered a host_0 and the client_1 (408) shown in FIG. 4. Moving upstream is another depiction at 606 Host_1-client_2 of an exemplary time division scheme occurring concurrently with the other pairs wherein a large amount of NAND is being requested for bus ownership to the buffer resources. These are only examples of possible combinations and/or allocations of clock cycles in the TDMA scheme for only one set of three memory devices. However, any combination of memories requiring access may be introduced with additional host-client pairs in a series of chain architecture.

The TDMA scheme of the hybrid arbitration scheme for the unified buffering system gives the added benefit of dedicating time for each client seen by a host in a uniform manner. Instead of clock cycles being wasted when there are no outstanding requests for a client, a time slot belonging to it is utilized in combination with the CS priority scheme to give a more efficient allocation across devices. For example, if no request for NOR is present, then every fourth clock cycle allocated for NOR is not wasted.

Figure 7:
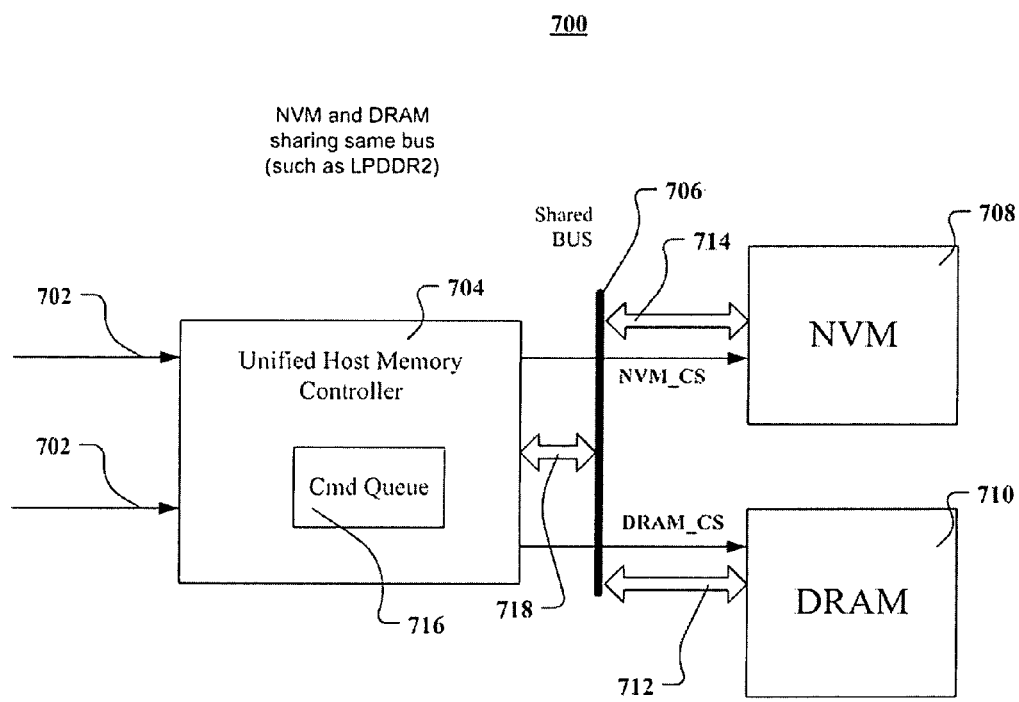
FIG. 7 is an illustration of parallel shared bus architecture for a memory buffering system in accordance with one embodiment of the present disclosure.

FIG. 7 illustrates a unified buffer system 700 of one embodiment of the disclosure. Nonvolatile memory (NVM) 708 is coupled to the same bus as DRAM memory 710 in a parallel configuration with a shared bus 706. Both NVM 708 and DRAM 710 share a same bus interface 718, such as a LPRDDR2 bus or other bus types. The NVM 708 and DRAM 710 blocks of FIG. 7 are not supposed to depict only one type memory of DRAM type or of nonvolatile memory type, but instead may depict multiple NVM memories in a parallel or shared bus configuration with the bus 706. The shared bus configuration illustrated is accessed by a command prioritization queue 716 for a unified host memory controller 704 that concurrently supports both NVM 708 memory and DRAM 710 memory. The NVM 708 may comprise any type of nonvolatile memory such as NAND and/or NOR type memory.

The memory controller 704 also includes a host interface 702 to receive memory access requests, addresses and write data from, and to transmit read data and status information to, one or more host devices (not shown) such as a processor, application-specific integrated circuit (ASIC), video controller, direct memory access controller and/or other device capable of issuing memory access requests. The UMC 704 may be formed in a discrete integrated circuit (IC) or, alternatively, in an integrated circuit device that includes the host device or other circuit blocks (e.g., in a chipset that includes a bus bridge, graphics port and processor interface, or in a system-on-chip). Also, the memory controller IC may be packaged with other ICs in various types of multi-chip packages (e.g., multi-chip modules, stacked packages, paper-thin packages, etc.). For example, in one embodiment, the entire memory buffering system 700, including the UMC 704 and memory devices 708 and 710 is packaged in a multi-chip package.

In one embodiment of FIG. 7, commands and data output from the unified memory controller 704 to the memory devices 708, and 710 via links 714 and 712, respectively, travel in a direction. By this operation, commands and data propagate through to the memory devices 708, and 710, being received and retransmitted, until being returned to the memory controller 704.

In another embodiment, signaling paths 714 and 712 between memory devices 708 and 710 and the shared bus, (and between the memory controller and a memory device) is formed by a set of electrical signal conductors such as printed circuit traces (e.g., disposed on a substrate to which the memory devices are mounted), electrical cables (e.g. micro-coaxial cables, twin-axial cables, twisted-pair cables, flex cables, and so forth). In an alternative embodiment the signaling paths may be established by direct contact between contacts or other interconnect structures disposed on adjacent memory devices (e.g. The memory devices being disposed such the contacts of adjacent memory devices abut one another to establish electrical contact). In yet other embodiments, fiber optic cables may be used to form the signaling paths between the memory devices and memory controller, or the signaling paths may be omitted altogether (or in part) and wireless connections used to establish communication links between adjacent devices (e.g., using infrared, radio-frequency or other wireless signaling technology) and/or, between the memory controller and memory devices.

Another embodiment of FIG. 7 illustrates all requests to access the NVM memory devices 708 and DRAM memory devices 710 coming to the UMC 704. Because NVM 708 and the DRAM 710 share the same bus interface an asymmetry in performance could adversely impact DRAM performance vital for continued operation. For example, a DRAM 710 can achieve very high bandwidth and can provide very high data bus utilization. However, the NVMs 708 can be relatively slow to respond to a command with the maximum bandwidth in the order of 10 times or more lower than DRAM 710 Therefore, the UMC 704 of the present disclosure utilizes a command prioritization arbitration. The UMC 704 does the arbitration itself to enable the proper chip select, either NVM_CS and/or DRAM_CS, as illustrated at FIG. 7. Once the proper chip select is chosen the UMC 704 sends the command in the shared bus via the link 718 shared by the NVMs 708 and DRAMs 710.

Figure 8:
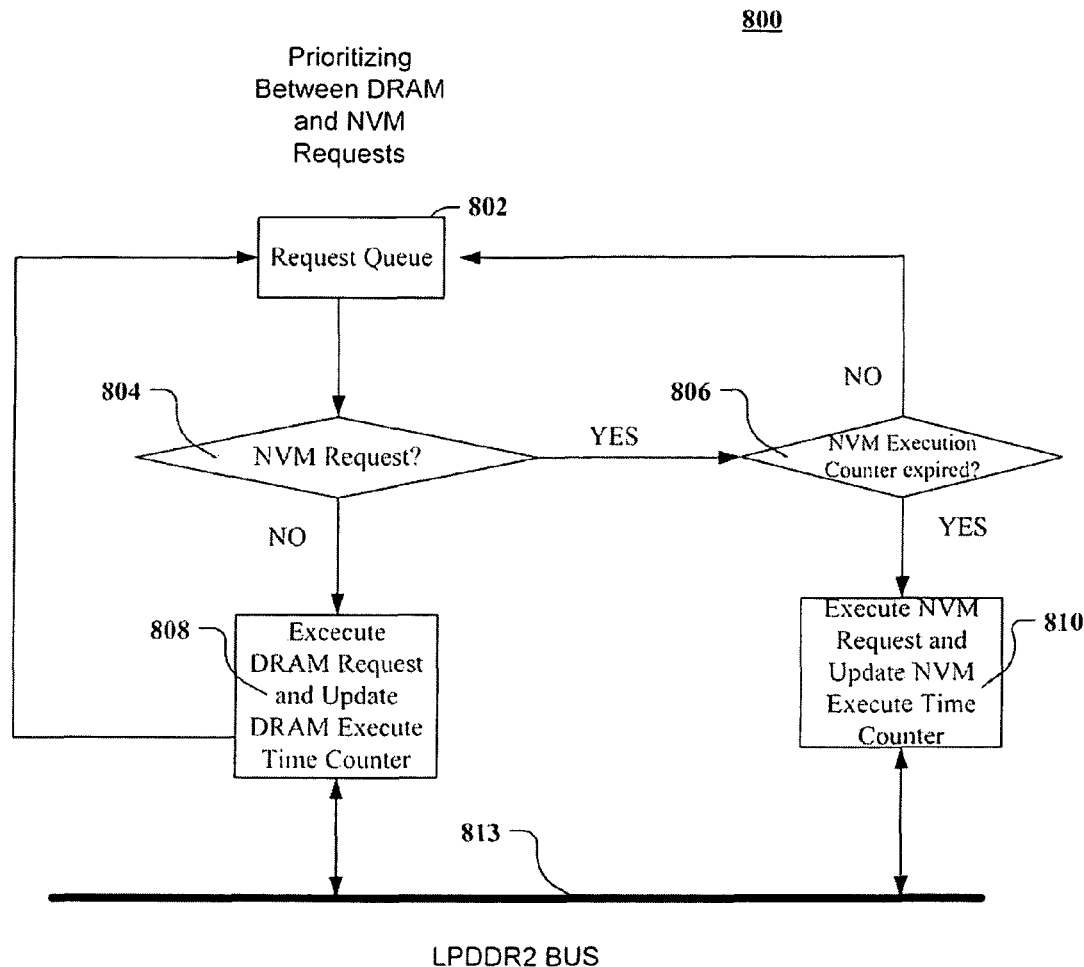
FIG. 8 is an illustration of execution commands form a unified memory controller in accordance with one embodiment of the present disclosure.

Referring now to FIG. 8 is illustrated an example of the prioritization scheme 900 implemented by the UMC 704 for arbitrating among request for access by DRAM 710 and NVM type memories 708. For each NVM command type, such as erase, program, read, etc., the UMC maintains a counter (not shown). Each time an NVM command is driven on the LPDDR2 Bus the UMC counter for the particular command is reset to a default value and then decremented at each controller clock cycle. When the counter reaches zero, the next NVM command is allowed onto the shared bus. The default value of each NVM command is programmable and depends on the timing specification of the NVM. For example, if a page program requires 200 clock cycles, then after the page program is submitted on the NVM bus, the page program counter is loaded with 200. This explicates that for the next 200 clock cycles no NVM command is permitted on the NVM bus.

By way of another example, at 802 the request queue maintained by the UMC receives request for access to the shared bus by various, memory types, such as DRAM and NVM memories, each, with corresponding request queues. Based oil the counter maintained for the memory and/or command type, if, there is a request at 804 to the NVM the UMC will decide if an NVM execution counter dedicated to NVM has expired or not. If it has not expired then request, queue at 802 is updated. If the NVM counter has expired the NVM request will be executed at 810 and the command execution time counter 101 subsequently be updated. For example, a NOR erase command execution time required is normally in the range of several hundred microseconds to milliseconds. For example, about 300 microseconds to 33 milliseconds or about 1 millisecond may be in execution time for a command. During this time there is no need to make any further request for NVM because bus cycles would be wasted and these cycles could be allocated to DRAM at 808. If no NVM request is seen at 804, then execution of DRAM request will be implemented and subsequently the counter will count down to zero until the request is complete. Therefore, bus utilization improves while concurrently maintaining high DRAM performance characteristics by determining when further request should be made for NVM.

Referring now to FIG. 9a and 9b, examples of one embodiment of the execution of commands from the UMC 704 are illustrated. When the UMC 704 for double data rate at the shared bus 706 submits a command the execution time is normally short. For example, a single read/write operation of burst length 4 would require only 10 clock cycles. The counter will count down to execute the proper command and when it is finished will allow further access to the bus. For example, at clock 1 through 3 a pre-charge command (PRECH) is executed by the UMC with a time for row pre-charging (TRP-3) delay of three clock cycles. TRP implies a row pre-charge timing herein any subsequent command followed by PRECH must wait TRP cycles. The TRP in this example is three. Further, in clock cycles 4 through 6, for example, activation of the columns and rows by CAS and RAS signals (not shown) occur with a delay depicted by a time for RAS to CAS delay (TRCD-3) as three clock cycles. The time to activate a row of a bank in a memory array is represented by the delay time for row activation strobe (TRAS-3) and is three clock cycles. In clock cycles 7 and 8 a read or write execution is performed wherein the delay is represented by a CAS latency and is the time interval between a read/write command to first piece of data (D). The delay is for D0, D1, D2, D3 for a multibit double edge data wherein a 16-bit bus is allocated two bits, for example. The data is then transferred back and the transaction is completed for a subsequent pre-charge action.

FIG. 9b another example of DRAM command execution cycles depicted within 10 clock cycles. For NVM, such as NOR or NAND read or write accesses are within microseconds to milliseconds. Therefore, without proper allocation DRAM would be starving. In DRAM cells capacitors must periodically be refreshed. Refresh time is typically about 64 ms and requires about 9 clock cycles to finish as represented by TREF parameter in FIG. 9b. Further, TRC is the time for one activation to a subsequent activation, for example about nine clock cycles. TRRD represents the time between successive active commands and is about 2 cycles, for DDR. TWPD parameter represents the minimum time interval between end of write cycle and pre-charge command. It is 3 cycles for DDR.

Figure 10:
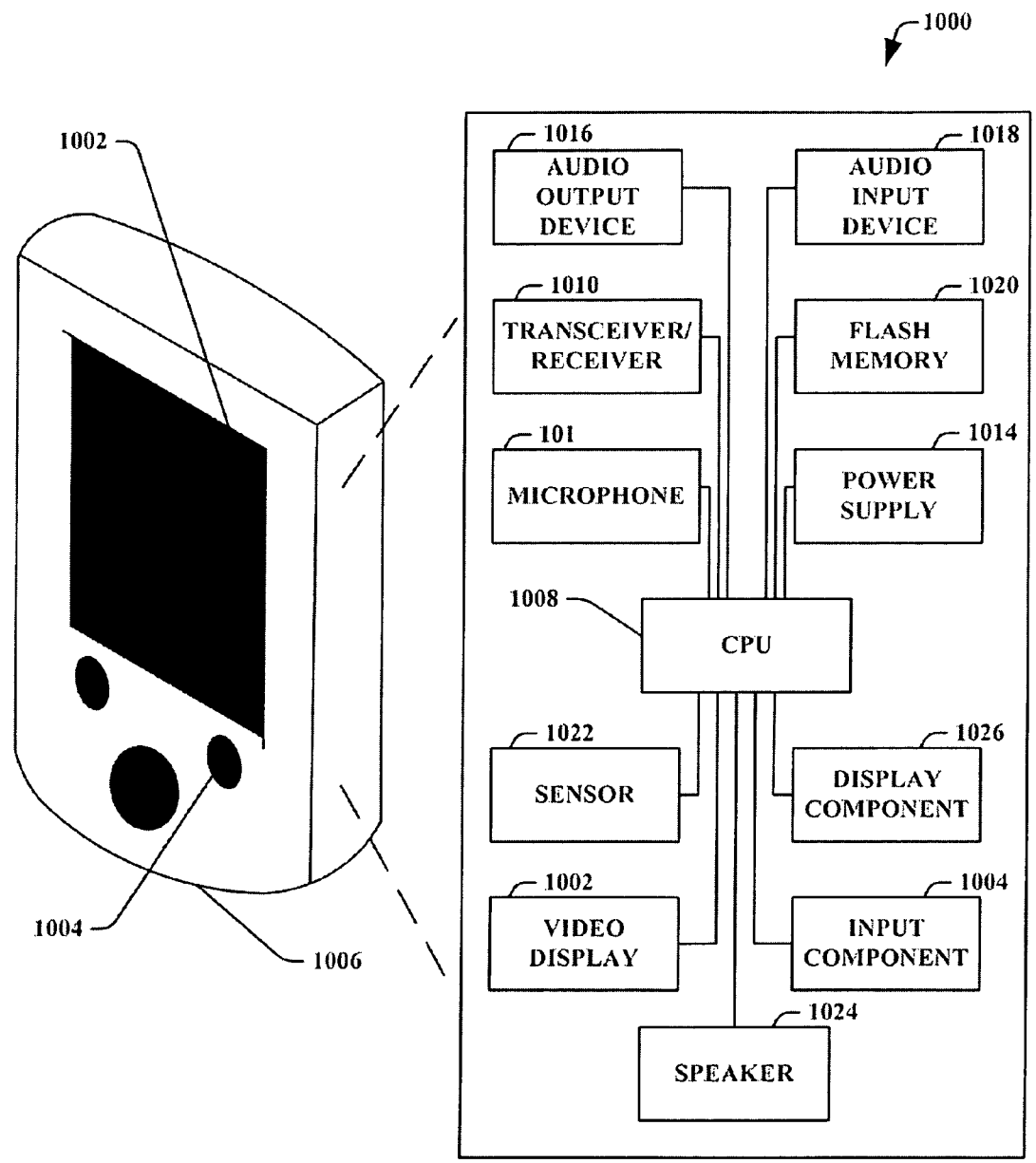
FIG. 10 is an isometric view of a device and block diagram according to yet one or more aspects of the present disclosure.

FIG. 10 is an exemplary portable electronic device, for example, a Personal Data Assistant (PDA) 1000 comprising a video display 1002, an input component 1004, a housing 1006, a CPU 1008, a transceiver and/or a receiver 1010, a microphone 1012, a power supply 1014, an audio output device 1016, an audio input 1018, flash memory 1020, various sensors 1022, and speaker(s) 1024. The flash memory 1020 utilizing dual bit and single bit memory devices manufactured with an improved buffering system and hybrid arbitration mechanism to improve read/write performance and provide low latency for mobile systems reduce reliability and density by an x decoding circuit capable of reducing the number of sector selects per sector and accessing a particular core sector by concurrently providing an accessing voltage and an inhibiting voltage per the present invention. The audio input device 1018 can be a transducer, for example. The input component 1004 can include a keypad, buttons, dials, pressure keys, and the like. The video display 1002 can be a liquid crystal display, a plasma display, an LED display, and the like, for displaying visual data and information. In accordance with another embodiment of the claimed subject matter, the portable device with flash memory 1020 manufactured according to the present invention, comprises cell phones, memory sticks, flash drive devices, video camcorders, voice recorders, USB flash drives, fax machines, flash memory laptops, MP3 players, digital cameras, home video game consoles, hard drives, memory cards (used as solid-state disks in laptops), and the like. The flash memory 1020 can include random access memory, read only memory, optical memory, audio memory, magnetic memory, and the like.

Although the invention has been shown and described with respect to one or more implementations, equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A memory buffering system comprising:
   a transfer bus;
   a unified memory controller (UMC) comprising a unified host buffer and a request queue; and
   a plurality of clients coupled together in a chain architecture, each of the plurality of clients comprising a respective memory element and a corresponding buffer, the plurality of clients being configured to communicate with the unified host buffer in a series bus configuration;
   wherein the UMC is configured to selectively arbitrate bus ownership of the transfer bus for the plurality of clients according to a time division multiple access (TDMA) scheme and a priority based scheme based on a number of requests pending from one or more of the plurality of clients; and
   wherein the UMC is further configured to allocate available buffer space of the corresponding buffer of each of the plurality of clients situated upstream from a memory element of a client being accessed from among the plurality of clients.

2. The memory buffering system of claim 1, wherein the plurality of clients further comprises a plurality of slave controllers coupled to the plurality of memory elements.

3. The memory buffering system of claim 1, wherein the plurality of memory elements further comprise a nonvolatile memory or a volatile memory or both the nonvolatile memory and the volatile memory.

4. The memory buffering system of claim 1, wherein the plurality of memory elements comprise a plurality of memory arrays and a plurality of state machines.

5. The memory buffering system of claim 2, wherein each of the plurality of slave controllers comprise a buffer and a transfer logic block.

6. The memory buffering system of claim 1, wherein:
the UMC uses the priority based scheme for bus conditions when a number of requests for any of the plurality of clients is less than a predetermined number of outstanding requests, and
the UMC uses the TDMA scheme otherwise.

7. The memory buffering system of claim 1, wherein the priority based scheme comprises at least one chip select in the chain architecture.

8. The memory buffering system of claim 1, wherein the TDMA scheme provides a uniform latency for the plurality of clients by dedicating a plurality of non-overlapping time slots of a clock cycle to the plurality of clients, respectively.

9. The memory buffering system of claim 3, wherein the nonvolatile memory comprises a NAND or NOR memory and the volatile memory comprises a DRAM memory.

10. A memory buffering system comprising:
a unified memory controller (UMC) comprising a unified host buffer, a counter, and a request queue;
a plurality of memory elements configured in parallel in a shared bus configuration;
wherein the UMC is configured to selectively allocate bus ownership for the plurality of memory elements according to a time division multiple access (TDMA) scheme and a priority based scheme based on a number of requests pending in the request queue from one or more of the plurality of clients; and
wherein the UMC is further configured to allocate available buffer space of buffers corresponding to each of the plurality of memory elements situated upstream from a memory element being accessed from among the plurality of memory elements.

11. The memory buffering system of claim 10, wherein the plurality of memory elements comprise a nonvolatile memory or a volatile memory or both.

12. The memory buffering system of claim 11, wherein the nonvolatile memory is a NAND or NOR memory and the volatile memory is a DRAM memory.

13. The memory buffering system of claim 12, wherein the UMC arbitrates bus ownership by a priority scheme comprising at least one chip select and at least one shared bus.

14. The memory buffering system of claim 10, wherein the counter stores a programmable default value for allocating clock cycles for a particular memory.

15. The memory buffering system of claim 10, further comprising a plurality of chip selects.

16. The memory buffering system of claim 15, wherein the plurality of chip selects comprises a nonvolatile memory chip select and a volatile memory chip select.

17. The memory buffering system of claim 10, wherein each memory element from the plurality of memory elements comprises the corresponding buffer and wherein the unified host buffer is a size capable of holding NAND, NOR and DRAM memory.

18. A memory buffering system comprising:
a plurality of clients coupled to one another via respective serial bus links that extend between adjacent clients,
a plurality of memory elements disposed within the plurality of clients, respectively;
a unified memory controller (UMC) coupled to a first client via a transfer bus and configured to:
facilitate read and write operations on the plurality of memory elements through the first client by using a plurality of chip selects, wherein the plurality of chip selects identify the plurality of memory elements, respectively;
analyze a number of read or write requests pending from one or more of the clients; and
arbitrate the transfer bus to selectively provide access to the plurality of clients on the transfer bus according to a priority based scheme and a time division multiple access (TDMA) scheme based on the number of read or write requests pending;
wherein upon receiving a read or write request from the UMC over the transfer bus, the first client selectively forwards the read or write request to a second, adjacent client based on a chip select correspondingly provided with the read or write request.

19. The memory buffering system of claim 18:
wherein the UMC provides bus access to the plurality of clients according to the priority based scheme if the number of read or write requests pending is less than a predetermined request threshold, and
wherein the UMC provides bus access according to the TDMA scheme if the number of read or write requests pending is more than the predetermined request threshold.

* * * * *